United States Patent [19]
Heneman

[11] Patent Number: 6,026,349
[45] Date of Patent: Feb. 15, 2000

[54] ENERGY STORAGE AND DISTRIBUTION SYSTEM

[76] Inventor: Helmuth J. Heneman, 3918 Pinesbury, Houston, Tex. 77084

[21] Appl. No.: 08/965,241

[22] Filed: Nov. 6, 1997

[51] Int. Cl.[7] .................................................. H02J 3/06
[52] U.S. Cl. ................. 702/60; 702/63; 307/19; 307/21; 307/23; 307/45; 363/34
[58] Field of Search .................... 364/528.21, 23, 364/528.26–528.3, 528.32, 132, 138, 155, 156; 307/19, 21, 23, 29, 44–46, 51, 57, 64–66, 72, 74, 75, 76, 80, 84, 87; 363/1, 34–36; 702/60–65, 188, 189; 290/30 R, 30 A, 30 B, 30, 32, 4 R, 4 A, 1 R, 54, 43, 44; 417/334; 322/4, 7, 21–24, 36, 37; 320/101, 124, 125, 127, 130, 137, 138, 147, 166, 167, DIG. 11, DIG. 14, DIG. 23, DIG. 36; 60/641.2, 641.12, 659, 660, 652, 398, 400, 404, 641.14, 413; 323/909, 371, 299, 271, 282, 284, 285, 287; 340/657, 658, 660–664

[56] References Cited

U.S. PATENT DOCUMENTS

| Re. 27,842 | 12/1973 | Park | 307/52 |
|---|---|---|---|
| 369,443 | 9/1887 | Edison | 307/24 |
| 867,065 | 9/1907 | Marburg | 307/29 |
| 1,080,029 | 12/1913 | Walker | 307/45 |
| 1,699,128 | 1/1929 | Warren | 307/57 |
| 1,743,771 | 1/1930 | Hall | 307/24 |
| 1,915,074 | 4/1933 | Stone | 307/18 |
| 3,564,275 | 2/1971 | Eberle | 307/29 |
| 3,629,562 | 12/1971 | Davis | 364/528.32 |
| 4,124,805 | 11/1978 | Jacoby | 290/1 R |
| 4,237,692 | 12/1980 | Ahrens et al. | 60/659 |
| 4,248,043 | 2/1981 | Stewart, Sr. | 60/325 |
| 4,275,310 | 6/1981 | Summers et al. | 290/1 R |
| 4,347,706 | 9/1982 | Drost | 60/659 |
| 4,353,214 | 10/1982 | Gardner | 60/652 |
| 4,380,419 | 4/1983 | Morton | 417/334 |
| 4,593,202 | 6/1986 | Dickinson | 290/54 |
| 4,849,648 | 7/1989 | Longardner | 290/54 |
| 5,241,217 | 8/1993 | Severinsky | 307/64 |
| 5,317,904 | 6/1994 | Bronicki | 62/87 |
| 5,376,828 | 12/1994 | Kim et al. | 307/64 |
| 5,448,889 | 9/1995 | Bronicki | 60/641.14 |
| 5,483,108 | 1/1996 | Girard et al. | 307/64 |
| 5,537,822 | 7/1996 | Shnaid et al. | 60/659 |
| 5,646,458 | 7/1997 | Bowyer et al. | 307/64 |

OTHER PUBLICATIONS

IEEE, High–Voltage DC Transmission, p. 63–72, 1996, (No date with month).

*Primary Examiner*—Hal Wachsman
*Attorney, Agent, or Firm*—Fulbright & Jaworski L.L.P.

[57] ABSTRACT

An energy storage and distribution system provides energy from a first energy related infrastructure characterized by a first energy grid to a second energy related infrastructure characterized by a second energy grid that is substantially independent of the first energy grid. The system includes an energy storage facility that is located in substantial proximity to a common boundary of the first and second energy related infrastructures, and a first energy transport mechanism that is coupled to the first energy related infrastructure and is capable of providing energy for storage in the energy storage facility. The system also includes a second energy transport mechanism that is coupled to the energy storage facility and is capable of providing energy from the energy storage facility to the second energy related infrastructure. Each of the first and second energy grids has an electrical power generation unit and high voltage A/C transmission lines. In a method for providing energy from the first energy grid to the second energy grid, primary electrical power is generated at a base load electrical power generation facility operating in the first energy grid. The primary electrical power is then selectively transmitted to an energy storage and conversion facility situated in substantial proximity to the common boundary between the energy grids where it is converted into stored energy. Then, the stored energy is selectively converted into secondary electrical power, before being transmitted to the second energy grid.

24 Claims, 6 Drawing Sheets

ENERGY STORAGE AND DISTRIBUTION SYSTEM

BACKGROUND OF THE INVENTION

1. Field of the Invention

The present invention relates to distribution and conservation of energy, and more particularly to an electrical power storage and conversion facility located at or near the intersection of electrical power grids.

2. Description of the Related Art

The United States and many other countries are partitioned into discrete geographic regions or "power grids" in which power plants coordinate with one another to provide electricity generating capabilities. These power grids evolved as power plants built transmission lines to serve remote markets. In most cases, transmission lines and loads at the boundaries between power grids are sparse and carry light loads, though this is not always the case. FIG. 1 is a United States map depicting areas covered by existing power grids or North American Electric Reliability Council (NERC) regions 100. Each of the NERC regions 100 encompasses a number of power companies, cooperatives and authorities. Many other countries are similarly divided into power grids.

Unlike power movement internal to the coordinated power grids, moving power from one power grid to another is very difficult. As noted, the transmission lines near boundary regions tend to be light, but there are commercial reasons as well. A power producer in one region is not excited by the prospect of cheap power from a neighboring region flooding into its region. The resulting lack of readily available and low-cost electricity in underdeveloped border regions results in stifled economic growth.

To further complicate potential power transfers, power generators in one region often produce power out of phase with that in the surrounding regions. For inter-region power transfer, these mismatches give rise to the necessity to convert the AC power to DC power, and then to reconvert the DC power back to AC power with the correct phase and frequency. Typical equipment includes a large motor and converter in the sending region (or power grid) and an inverter and generator in the receiving region. U.S. Pat. No. 5,561,597, entitled "COMPACT AND EFFICIENT TRANSFORMERLESS POWER CONVERSION SYSTEM" describes a technique for directly transferring power from one polyphase system to a second polyphase system without the use of a DC link. However, the system provides no energy storage capabilities.

Equipment associated with present conversion techniques is expensive (often reaching the $30–40 million range) and inefficient in that it only allows energy to move across a border between power grids as it is consumed in the receiving power grid. Since regional loads and prices tend to peak concurrently, economic benefit is minimized.

Referring briefly to FIG. 2, a load distribution chart illustrating a typical weekday electrical load profile in a given power grid is shown. The power generating capabilities of the power grid are constructed such that the majority of power demand (area 102) can be satisfied by baseload electrical power generation units, which typically take the form of coal or nuclear power plants. During periods of peak demand, which usually occur around midday, the difference between the power demand and power supplied by the baseload electrical power generation units is satisfied by cycling units (area 104) and/or peaking units (area 106) such as combustion turbines. This is significant from a cost standpoint because the power supplied by cycling and/or peaking units is much more expensive than the power supplied by the baseload electrical power generation units.

In the system depicted by FIG. 2, the baseload electrical power generation units are able to satisfy approximately 50% of peak load when operating at their highest load factor. As can be seen (areas 108), however, the baseload electrical power generation units of a typical power grid may not operate at full capacity during a significant portion of the day. Operating the baseload electrical power generation units at full capacity is desirable because the unit cost of electricity produced during such periods can be much less than the unit cost of electricity produced when the baseload units are operating at less than full capacity.

Various systems and methods for storing the relatively inexpensive off-peak energy within the confines of a power grid are known. For example, U.S. Pat. No. 4,849,648 to Longardner, entitled "Compressed Gas System and Method" and hereby incorporated by reference, discloses compressed air energy storage satellite facilities or tanks within an individual electrical power grid. The satellite facilities are independent of geological formations and are described as being capable of increasing the load carrying capacity of an electrical power system without increasing the size of the baseload electrical power generation facility or of the power transmission lines.

More specifically, the system described in Longardner circulates a portion of the compressed air back through a compressor located in a gas flow circuit, causing turbulent flow in a series of tanks, thus slowing heat energy loss to the environment. A heat exchanger located in the circuit of the gas flow cools the gas while it is being stored, reducing the work needed to compress a given mass of gas into the tanks.

Similarly, U.S. Pat. No. 4,353,214 to Gardner, entitled "Energy Storage System for Electrical Utility Plant" and hereby incorporated by reference, illustrates a method for storing and retrieving surplus energy produced by electric utility plants. The disclosed system method is implemented by utilizing large, underground caverns for storing a pressurized gas used as both the energy storage medium and the working gas in an expansion turbine. The disclosed system is capable of use with a single unit generator/motor combination with disengageable clutch assemblies to couple the unit to the turbine or compressor, depending on the operation phase.

According to Gardner, gas is communicated from a low pressure cavern through the closed system and into a compressor. The compressor is driven by a motor or equivalent power means and is actuated by electrical output received from the utility with which the system is associated. The compressed fluid is then fed to a high pressure conduit which is coupled to a high pressure cavern, thereby converting electrical energy from the associated utility into potential energy.

Energy retrieval in Gardner is effected by releasing the compressed gas through a high pressure release conduit to a turbine and generator which collectively produce the electrical output. The heated gas is then mixed and reacted with one or more fuels in a heating chamber preliminary to entering an expansion turbine which drives the generator. The expanded gas from the turbine is returned to the low pressure cavern through a return conduit.

Similar systems for storing energy by using compressed air energy storage (CAES) systems are known. The following patents, each of which is hereby incorporated by reference, are exemplary of such systems: U.S. Pat. No. 4,124,805 to Jacoby, entitled "Pollution-Free Power Generating and Peak Power Load Shaving System" (employing a subterranean cavity in thermal communication with a geological heat source); U.S. Pat. No. 4,237,692 to Ahrens et al., entitled "Air Ejector Augmented Compressed Air Energy Storage System" (utilizing a plurality of underground reservoirs in conjunction with a variable geometry air ejector and gas turbine system); U.S. Pat. No. 4,275,310 to Summers et al., entitled "Peak Power Generation" (employing a turbine generator facility activated by the expansion of compressed air withdrawn from an underground air storage reservoir in a substantially isothermal system); and U.S. Pat. No. 5,537,822 to Shnaid et al., entitled "Compressed Air Energy Storage Method and System" (heating air removed from a CAES system by using an external low grade energy source). In all of these references, however, use of the disclosed energy storage system is shown with a single generation facility or power grid.

SUMMARY OF THE INVENTION

Briefly, an energy storage and distribution system according to the present invention is designed to move power across regional boundaries or power grids in a manner conducive to matching generation with consumption—either concurrently or on a time delay basis. Energy transfers are facilitated by placing electric energy storage systems at or near the boundary regions between power grids. This arrangement solves power phase problems because the power grids are never directly in contact. Rather, they are separately attached to the energy storage system and able to deliver or receive power from the facility according to consumer needs.

The nature of the energy storage system may be dictated in part by local geology. Where suitable underground caverns are available, CAES technology may be the most economical energy storage medium. Where no suitable underground formations are available, but a useful water resource is present, a pumped water (also referred to as "pumped hydro") technique can be employed. Other energy storage techniques include mass fly wheels, batteries and fuel cells.

In a broader sense, the invention can be extended to include energy forms other than electricity. The concept of energy storage at "node points" is again utilized. In this broader embodiment of the invention, the "node points" are geographical locations at which multiple energy-related infrastructures currently meet or are capable of being extended to meet. The energy-related infrastructures may include multiple energy forms and financial and communications infrastructures. For example, it is envisioned that coal, gas, natural gas liquids, oil, and electric power could be stored at a common market center where energy forms are bought, sold and bartered via multiple communication systems (e.g., dedicated line, cellular and radio) and in multiple markets such as cash and futures.

Benefits of such "nodes" include increased reliability due to a reduced chance of common mode failure. The nodes also provide greater flexibility by enabling energy movement from a broad range of surplus markets to markets of need. Also, economies of scale and the effect of expanded choice on market forces result in less expensive energy for end users.

Thus, the present invention alleviates the need for expensive conversion equipment at regional boundaries between power grids and provides for more efficient utilization of energy and energy generation resources.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
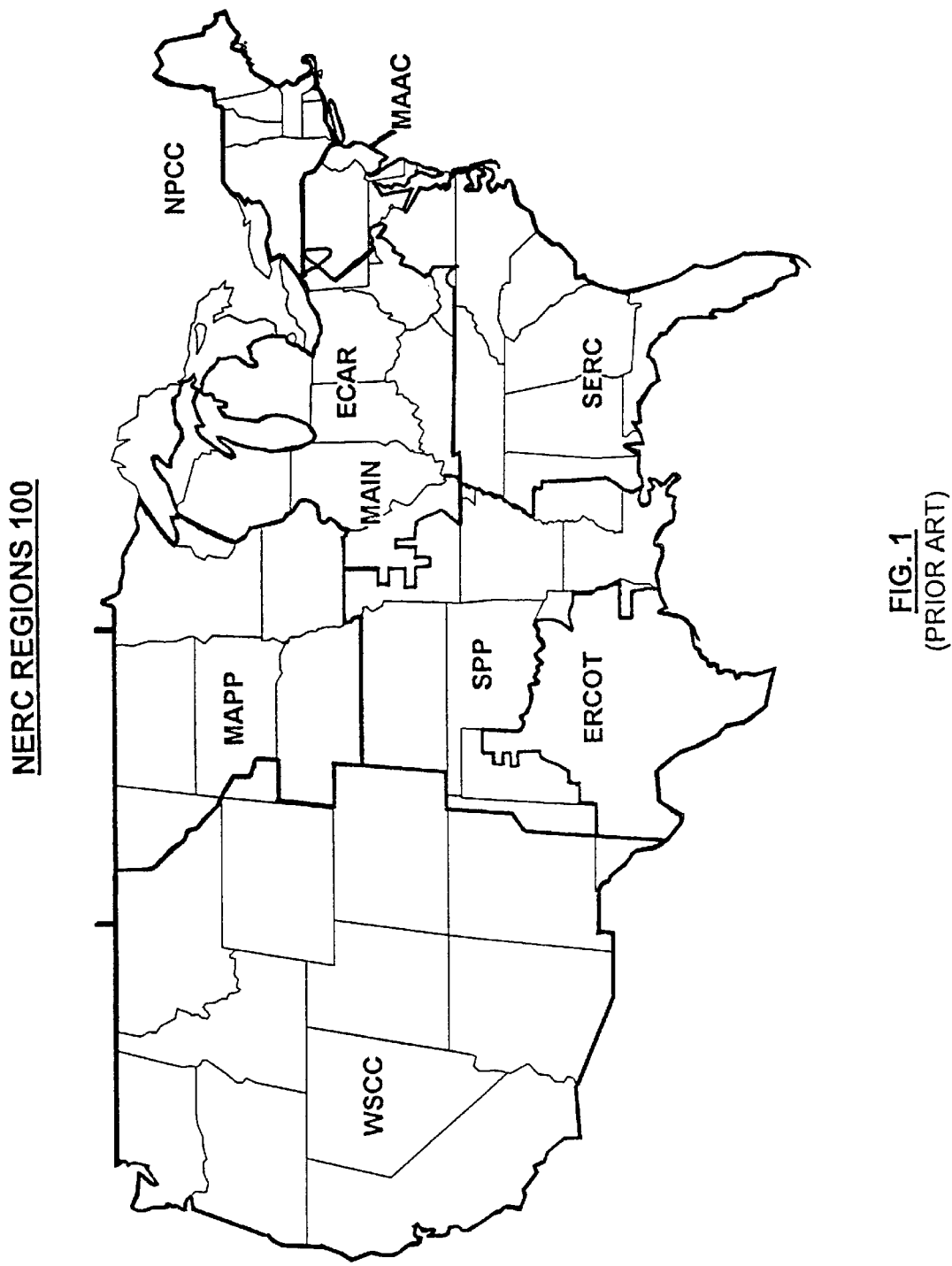
FIG. 1 is map depicting existing NERC regions in the United States.
Figure 2:
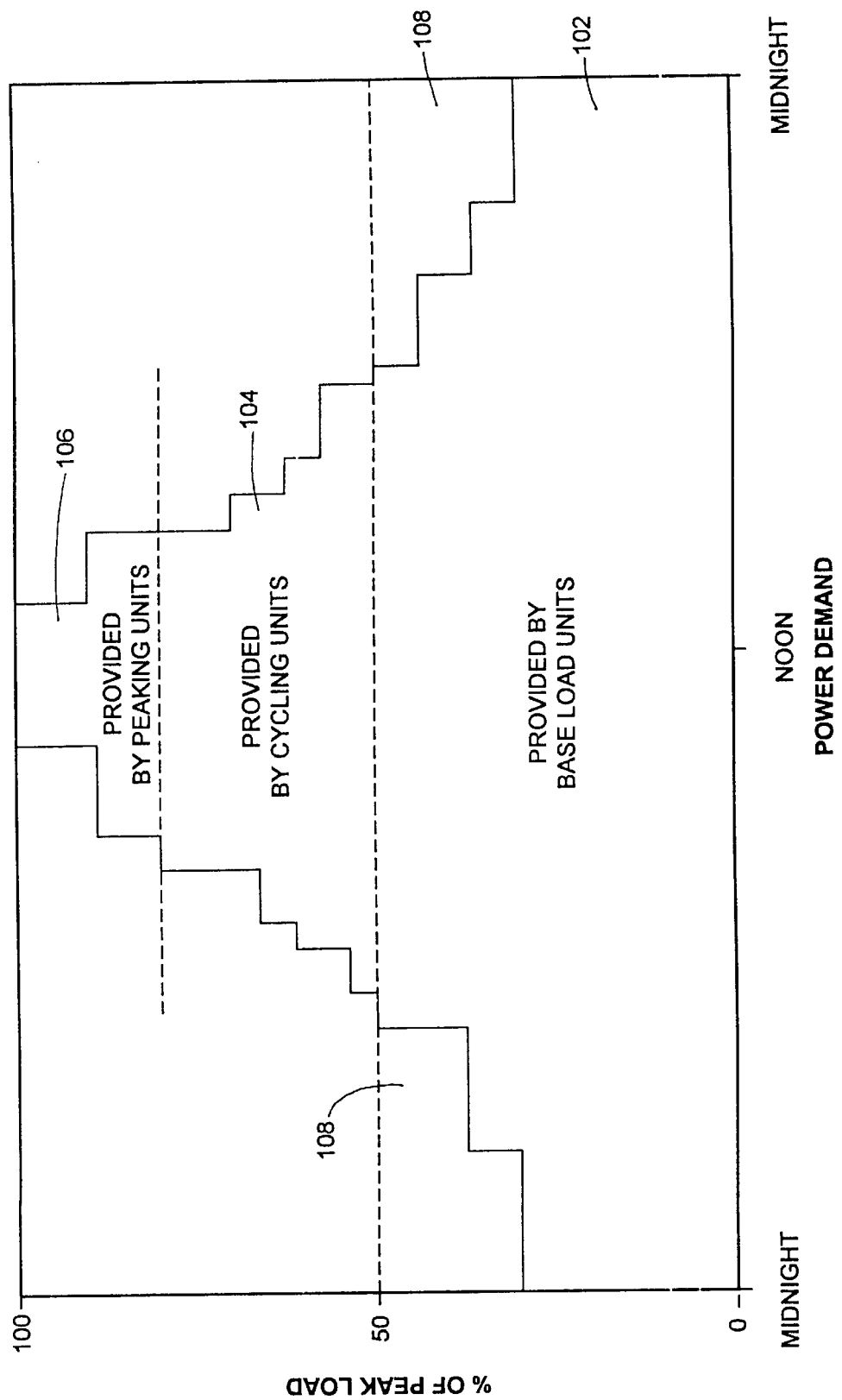
FIG. 2 is a load distribution chart illustrating a typical weekday electrical load profile in a given power grid.
Figure 3:
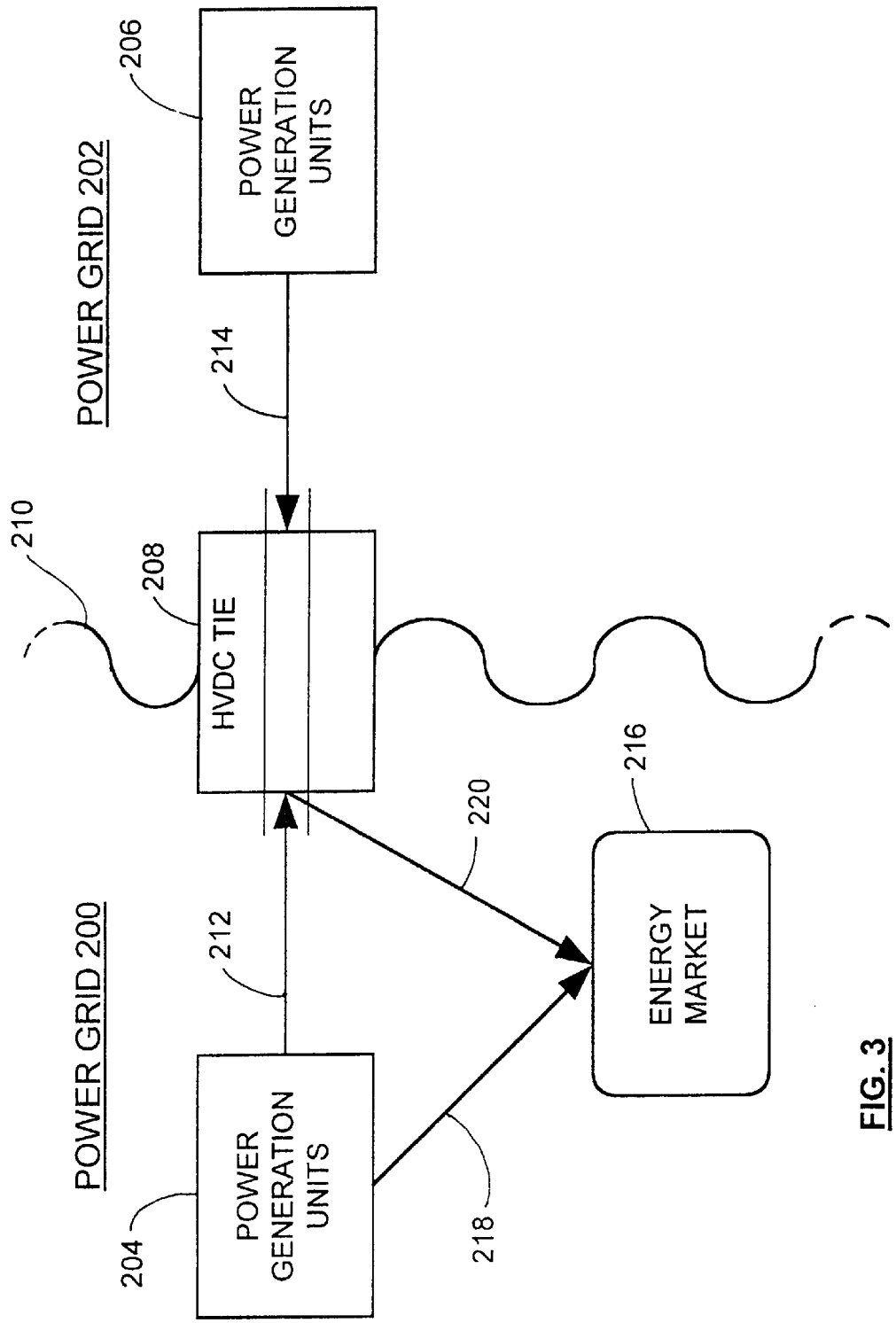
FIG. 3 is a diagram of power grids linked by a high voltage DC tie according to the prior art.

Referring now to FIG. 3, a diagram of power grids 200 and 202 linked via a prior art high voltage DC (HVDC) tie 208 according to the prior art is shown. The HVDC tie 208, described more fully below, is located at the boundary 210 between the power grids 200 and 202. The power grids 200 and 202 consist of power generation units 204 and 206, respectively. The power generation units 204 and 206 may take many forms, including baseload coal, nuclear or hydro power plants, as well as peaking and cycling units (such as combustion turbines) that provide power during periods of peak demand.

The power generation units 204 are coupled to the HVDC tie 208 via high voltage AC transmission lines 212, while the power generation units 206 are coupled to the HVDC tie 208 via high voltage transmission lines 214. The power generation units 204 of power grid 200 are coupled to an exemplary energy market 216 by high voltage AC transmission lines 218. High voltage AC transmission lines 220 also supply power from the power grid 202 to the energy market 216 via the HVDC tie 208. The power grid 200 may similarly supply electrical power to energy markets (not shown) in the power grid 202 via the high voltage AC transmission lines 212.

Although not shown, power substations having a plurality of regulator transformers and other circuitry are typically interspersed as required between the various components of FIG. 3. In a common AC power grid 200 or 202, power flow through an AC transmission line is manipulated by controlling the line impedance, the phase angle or the voltages, or a combination of such parameters. For example, current flow in a transmission line linking voltage sources of identical magnitude and a large phase angle difference is much greater than current flowing through a transmission line linking two voltage sources having a small phase difference. Large currents can cause excessive losses in a transmission line and may also result in damage to transmission equipment. Overcurrent conditions are typically sensed by protective relays (not shown) that cause circuit breakers to open the transmission connection.

The HVDC tie 208 is frequently used because many power electronic systems capable of high speed control of line parameters (i.e., line impedance, phase angle or voltage) do not function properly when two sides of an AC transmission line (shown as transmission lines 212 and 214) differ in frequency. This is due to phase angle changes that occur because of the difference between AC voltage frequencies in the power grids 200 and 202. The driving voltage corresponds to the difference between the two corresponding voltages, such that the current will fluctuate between zero and an unacceptably high value in unregulated systems. Two power grids 200 and 202 having the same nominal frequency but dissimilar frequency control strategies will also suffer from this drawback. In such circumstances, phase angle differences between the two power grids 200 and 202 will be inclined to drift, creating situations like those encountered when the frequencies are different.

Problems can arise even when the frequency control strategies of two power grids 200 and 202 are equivalent, such as when the power generation units 204 and 206 are electrically remote (i.e., a high impedance transmission path exists between the two power grids 200 and 202). Without the HVDC tie 208, phase angle differences between the voltages in remote AC connection points of the two power grids 200 and 202 will tend to fluctuate such that current through an AC interconnection may also fluctuate to unacceptable levels. One potential but less than desirable solution would require the installation of powerful AC lines having well above the nominal capacity required for transmission.

One known means of transporting surplus electric power involves high-voltage DC transmission via the HVDC tie 208. For example, one 600-MW "back-to-back" HVDC tie 208 connects Texas with the eastern United States. The term "back-to-back" typically refers to an energy conversion system in which AC-to-DC and DC-to-AC power electronic converters are located at the same site. As noted above, such configuration is typically required because the two AC systems involved generally have different frequency controls and cannot be directly interconnected. A DC busbar, harmonic filters, capacitors, switching gear, and other equipment are utilized in the conversion process carried out by a typical HVDC tie 208.

Another proposed solution for transmitting electrical power across power grids involves the installation of a thyristor-controlled phase-shifter capable of handling 360° of phase-shifting. The device would ideally be capable of internally shifting the voltage of one of the AC sides so that it remains continuously close in phase with the voltage of a second AC side. However, such a system may prove to be prohibitively expensive. Similarly, an HVDC tie 208 used in this situation would require two power electronic converters having a total power rating of twice the maximum required power transmission—also an expensive solution.

Figure 4:
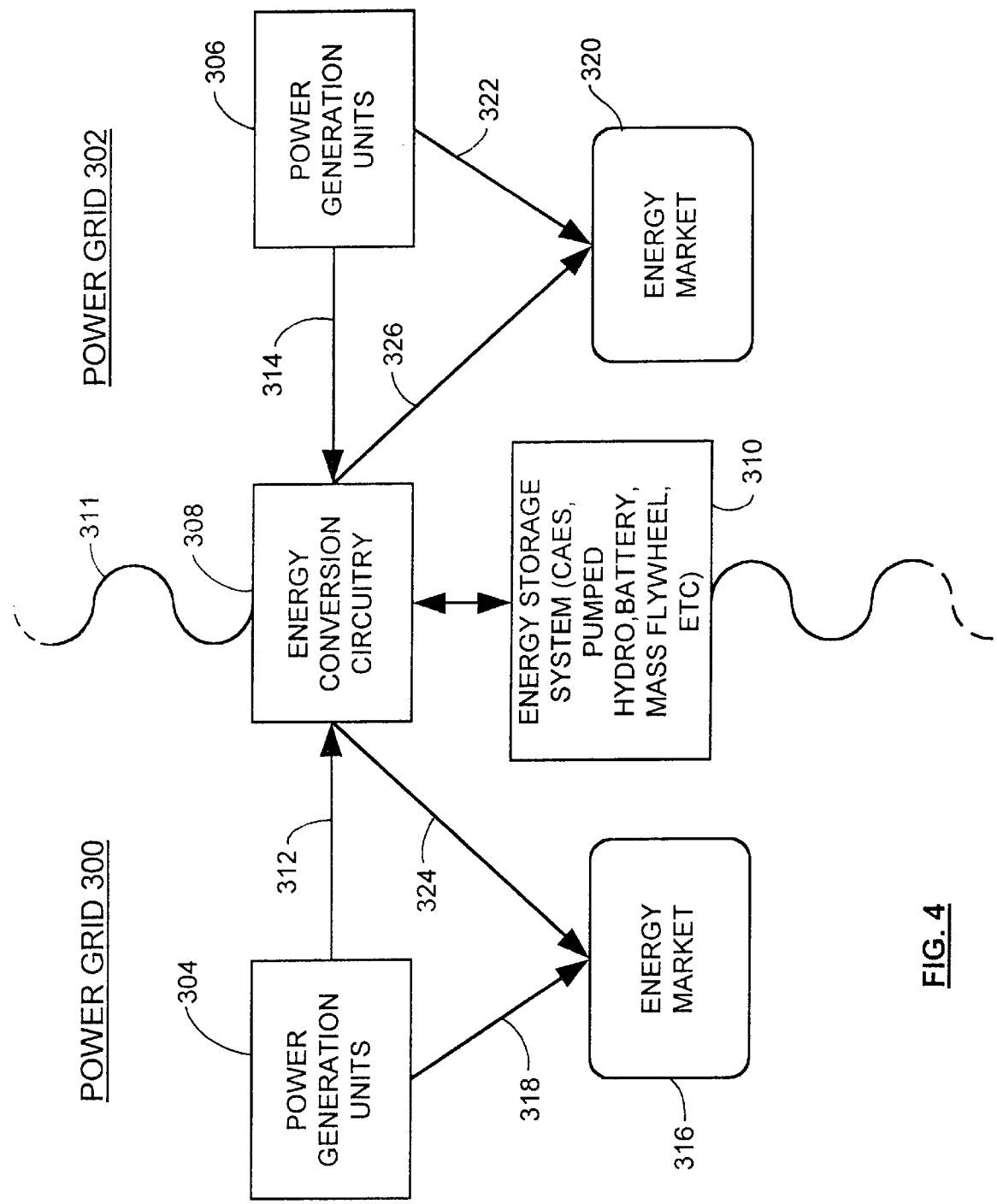
FIG. 4 is a diagram of an electric power storage and distribution system according to the present invention.

Referring now to FIG. 4, a diagram of a power grid 300 and a power grid 302 linked by an electric power storage and distribution system according to the present invention is shown. In the disclosed embodiment of the invention, an energy storage system 310 is placed at or in substantial proximity to a boundary 311 between the power grids 300 and 302. The power grids 300 or 302 may consist of the NERC regions 100 of the United States or Canada, or the power grids in or between different countries of the world. The energy storage system 310 receives and provides energy from/to energy conversion circuitry 308, and functions to alleviate many of the problems associated with prior methods of coupling such electrical power grids 300 and 302.

The power grids 300 and 302 consist of power generation units 304 and 306, respectively. As with the previously described power generation units 204 and 206, the power generation units 304 and 306 of FIG. 4 may take many forms, including baseload coal, nuclear or hydro power plants, as well as peaking and cycling units (such as combustion turbines) that provide power during periods of peak demand. The power generation units 304 are coupled to the energy conversion circuitry 308 via high voltage AC transmission lines 312, while the power generation units 306 are coupled to the energy conversion circuitry 308 via high voltage transmission lines 314.

The power generation units 304 of power grid 300 provide power to an exemplary energy market 316 through high voltage AC transmission lines 318. Similarly, the power generation units 306 of power grid 302 provide power to an energy market 320 through high voltage AC transmission lines 322. Typical power consumption in such energy markets 316 and 320 is discussed more fully below in conjunction with FIG. 6.

In the disclosed embodiment of the invention, the energy markets 316 and 320 are also capable of receiving energy stored in the energy storage system 310 (and converted to the required form by energy conversion circuitry 308) through high voltage AC transmission lines 324 and 326, respectively. The high voltage AC transmission lines 324 and 326 may also be integrated at various other points in the power grids 300 and 302.

The energy conversion system 308 is preferably capable of receiving/providing AC power from/to either power grid 300 or 302. Further, the energy conversion system is preferably capable of converting energy stored in the energy storage system 310 into AC waveforms that substantially match the existing AC frequencies, phase angles and voltages of the power grids 300 and 302.

The placement of the energy storage system 310 at or near the boundary 311 functions to facilitate the transfer of electricity between the power grids 300 and 302. Problems associated with phase mismatches are alleviated because the power grids 300 and 302 are not directly in contact. Rather, the power grids 300 and 302 are separately attached to the energy storage system 310 and able to deliver or receive power from the energy storage system 310 according to consumer needs.

The nature of the energy storage system 310 may be dictated in part by local geology. Where suitable underground caverns are available, CAES technologies such as those disclosed in the previously-incorporated references and FIG. 5 may be the most economical energy storage medium. Where no suitable underground formations are available, but a useful water resource is present, a pumped hydro technique can be employed. Pumped hydro techniques generally involve using electrical energy to pump water from a first elevation to a second, higher potential elevation. When energy is retrieved from such a system, the pumped water is allowed to return to the first elevation, powering electrical turbines in the process. Other energy storage techniques include mass fly wheels, batteries and fuel cells. The energy storage system 310 effectively augments energy transfer capabilities between power grid 300 and power grid 302 by allowing time-delayed energy transfers.

Figure 5:
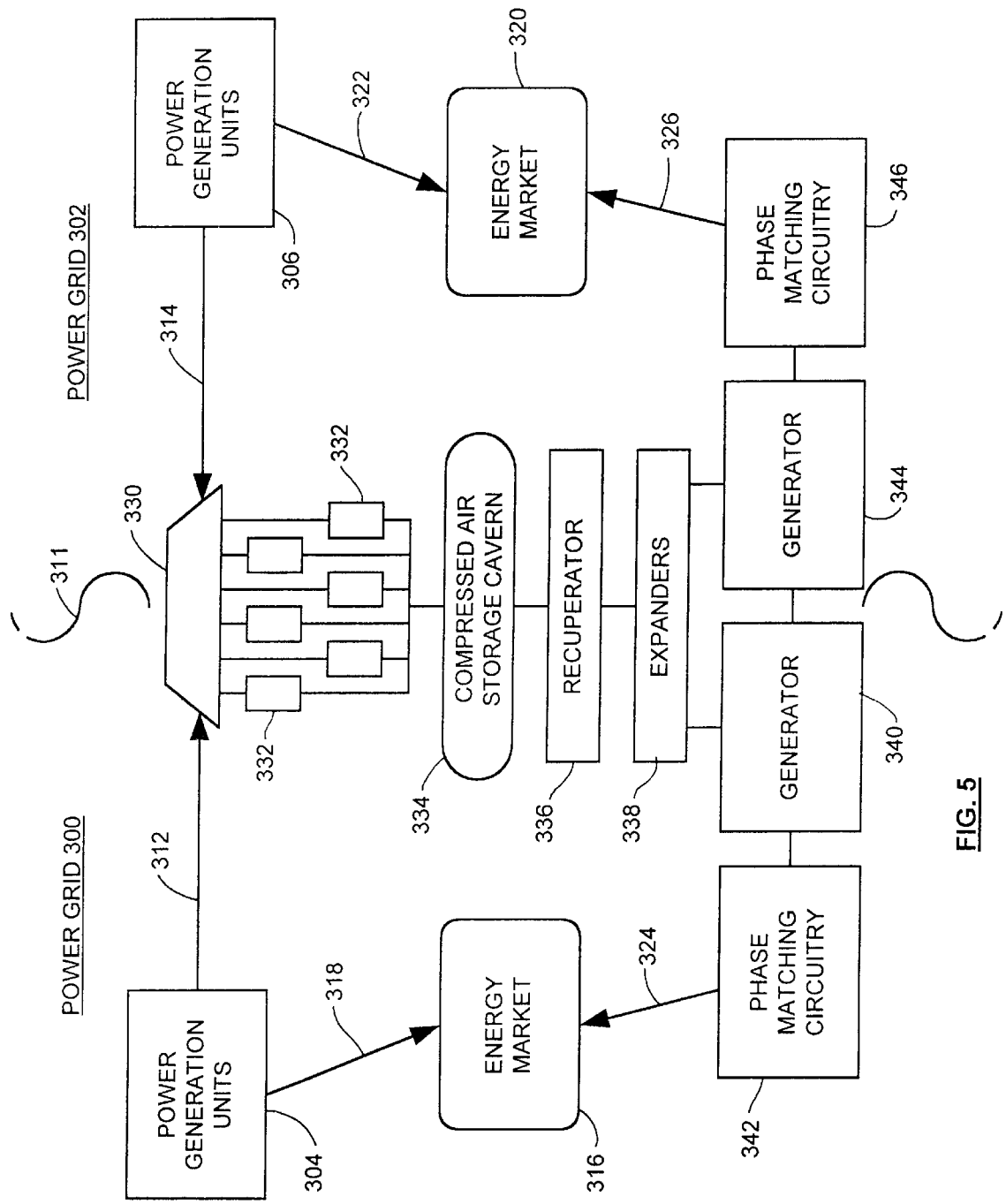
FIG. 5 is diagram of an exemplary electric power storage and distribution system utilizing compressed air energy storage (CAES) in accordance with the present invention.

Referring to FIG. 5, a diagram of an exemplary electric power storage and distribution system utilizing compressed air energy storage (CAES) as the energy storage system 310 (FIG. 4) is shown. In this embodiment of the invention, the energy conversion circuitry 308 of FIG. 4 is depicted as elements 330, 332, and 336–340, while the energy storage system 310 is shown as a compressed air storage cavern 334.

More specifically, a demultiplexing circuit 330 receives power from the power generation units 304 and 306 via high voltage AC transmission lines 312 and 314 respectively. The power received by the demultiplexing circuit is used to power a parallel bank of motors/compressors 332. Power from the power grids 300 and 302 can be distributed amongst the motors/compressors 332 in a number of ways, and depends to a certain extent on the relative amount of power received provided by the power grids 300 and 302 at any given time. The motors/compressors 332 provide high-pressure air (or other gaseous mixture) to the compressed air storage cavern 334. The compressed air storage cavern 334 may be subterranean or take the form of above-ground storage tanks. Suitable geographic formations include solution-mined salt caverns, depleted hydrocarbon fields, mined rock cavities and aquifers.

The process of retrieving energy from the air storage cavern 334 is commenced by providing the compressed air to a recuperator 336 and high pressure and/or low pressure expanders 338. The recuperator 336 and expanders 338 function to convert energy stored in the compressed air to rotational energy that is provided to generators 340 and 344, which in turn generate electrical power. In the disclosed embodiment of the invention, power provided by the generator 340 is conditioned by phase matching circuitry 342 for use by the energy market 316 of power grid 300. Similarly, power provided by the generator 346 is conditioned by phase matching circuitry 346 for use by the energy market 320 of power grid 302. Many other operable configurations are possible, and the present invention is not considered to be limited to any particular number of generators or motors. As noted above, the energy storage system can also take many forms.

Figure 6:
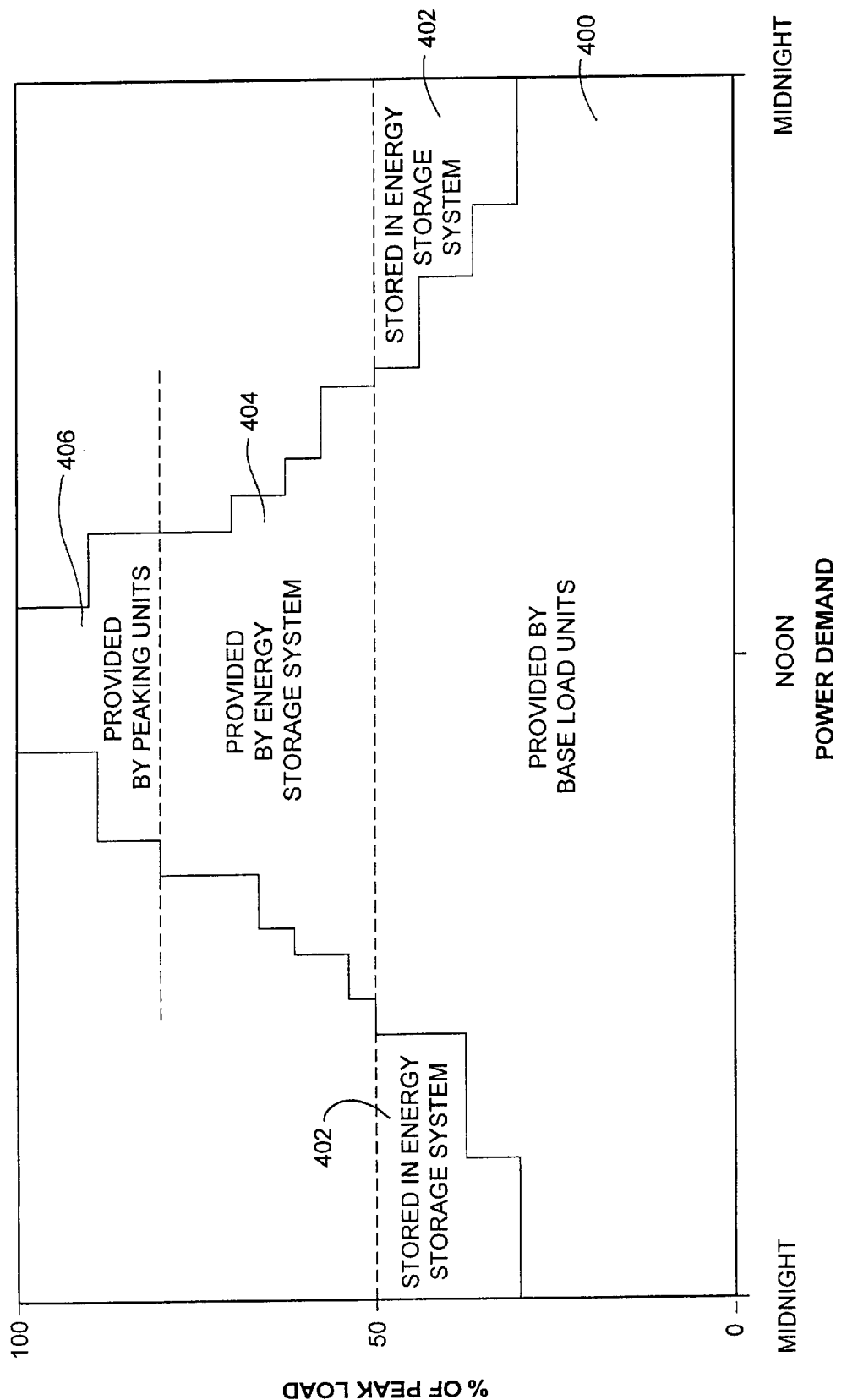
FIG. 6 is a load distribution chart illustrating power consumption in a power grid in accordance with the present invention.

Referring to FIG. 6, a load distribution chart illustrating power consumption in a power grid 300 or 302 in accordance with the present invention is shown. The power generating capabilities of the power grid 300 or 302 are constructed such that the majority of power demand (area 400) can be satisfied by the baseload electrical power generation units. In prior art systems the difference between the power demand and power supplied by the baseload electrical power generation units during times of peak demand is satisfied exclusively through the use of expensive cycling units and/or peaking units.

In the system depicted by FIG. 6, however, much if not all of the peak power demand (area 404) is satisfied by energy provided by the energy storage system 310, with the remainder (area 406) being satisfied by cycling or peaking units. Of import, the energy storage system 310 permits the baseload electrical power generation units to operate for longer periods (areas 402), with the surplus capacity being available for charging the energy storage system 310.

Because of the energy storage capabilities provided by the invention, a power grid 300 or 302 that is able to deliver and accumulate power at a low rate can sell at a higher rate to other power grids. In effect, the invention allows baseload electrical power generation facilities—which are cheaper to operate than cycling and/or peaking units—to run at a high load factor for longer periods of time. The present invention thereby increases the occurrence of the variable cost and fixed cost efficiencies associated with continuous operation of the baseload facilities. Moreover, in areas of high demand, the load carrying capacity of the power grids 300 and 302 can be increased without increasing the size of the baseload electrical power generation facility or transmission lines.

Thus, an advantage provided by the present invention is to uncouple energy production and consumption in time.

The convenient energy storage system also allows a large number of markets to be linked to cost-effective production options. Such benefits are likely to facilitate efforts that are underway or completed in many states to deregulate electricity markets, allowing consumers to choose their own electricity supplier much the way as they now choose a long-distance carrier. Electric power is currently a $215 billion a year industry, while natural gas is $90 billion. Many states have introduced legislation to free all customers—residential and commercial alike—to chose their own electricity provider by the turn of the century. It is predicted the deregulation will spread rapidly across the U.S. The result of increasing deregulation should be greater inter-regional competition that benefits both producers of low-cost power and consumers.

Further, it is contemplated that a plurality of companies could utilize the energy storage and delivery capabilities provided by the present invention, effectively providing third-party access to larger markets. Making the interconnection a power source as well as an access point may also do much to equalize access to economic opportunity at disadvantaged areas lying along the margin of NERC or similar regions 100.

An energy storage and distribution system according to the disclosed embodiment of the invention also permits "black" starts in the event that one portion of an electrical power grid 300 or 302 fails by providing the power necessary to restart electricity generation equipment. This capability is extended to multiple regions due to the placement of energy storage capabilities near a regional boundary 311. Reliable delivery of energy resources to end users is thereby enhanced.

In a broader sense, the invention can be extended to include energy forms other than electricity. The concept of energy storage at boundary regions or "node points" is again utilized. In this broader embodiment of the invention, the "node points" are geographical locations at which multiple energy related-infrastructures (such as pipelines) currently meet or are capable of being extended to meet. The energy-related infrastructures may include multiple energy forms and financial and communications infrastructures. For example, it is envisioned that coal, gas, natural gas liquids, oil, and electric power could be stored at a common market center where energy forms are bought, sold and bartered via multiple communication systems (e.g., dedicated line, cellular and radio) and in multiple markets such as cash and futures. Further, energy forms could be transformed at the node points, such as generating electricity from a coal-powered plant incorporated within a node point.

Benefits of such "nodes" include increased reliability due to a reduced chance of common mode failure. The nodes also provide greater flexibility by enabling energy movement from a broad range of surplus markets to markets of need. The nodes preferably provide the physical ability to conduct commerce in fungible and transportable "energy units." These energy units might be traded on a spot or futures basis in a standardized manner that is independent of the form of the energy source or the mechanism used to transport the energy units to the node. Node-to-node commerce in monetary units is therefore possible without the need for instantaneous transmission of the energy units (similar to instantaneous bank-to-bank transfers of "money"). Also, economies of scale and the effect of expanded choice on market forces result in less expensive energy for end users.

Thus, an energy storage and distribution system designed to move energy across regional boundaries or power grids in a manner conducive to matching generation with consumption has been described. Energy transfers are facilitated by placing electric energy storage systems at or near the boundary regions between power grids. This configuration alleviates the need for expensive conversion equipment at the regional boundaries and provides for more efficient utilization of energy and energy generation resources.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. An energy storage and distribution system for providing energy from a first energy-related infrastructure characterized by a first energy grid to a second energy-related infrastructure characterized by a second energy grid, the first and second energy-related infrastructures having a common boundary, the energy storage and distribution system comprising:

an energy storage facility located in substantial proximity to the common boundary of the first and second energy-related infrastructures;

a first energy transport mechanism coupled to the first energy-related infrastructure and the energy storage facility, the first energy transport mechanism capable of providing energy for storage in the energy storage facility; and a second energy transport mechanism coupled to the energy storage facility and the second energy-related infrastructure, the second energy transport mechanism capable of providing energy from the energy storage facility to the second energy-related infrastructure.

2. The energy storage and distribution system of claim 1, further comprising:

a communication network coupled to the second energy transport mechanism and the first and second energy-related infrastructures, the communication network being configured to generate control signals for energy transfer, wherein the second energy transport mechanism is further configured to transport energy in response to the control signals.

3. The energy storage and distribution system of claim 2, wherein the second energy transport mechanism transports energy quantified by standardized energy units that are independent of the form of the energy stored in the energy storage facility.

4. The energy storage and distribution system of claim 1, wherein the first and second energy-related infrastructures are electrical power grids.

5. The energy storage and distribution system of claim 1, wherein the first energy transport mechanism is adapted to providing energy from the energy storage facility to the first energy-related infrastructure and the second energy transport mechanism is adapted to providing energy for storage in the energy storage facility.

6. The energy storage and distribution system of claim 1, wherein the first energy transport mechanism is substantially independent of the second energy transport mechanism.

7. An energy storage and distribution system for providing energy from a first electrical power grid to a second electrical power grid, each of the first and second electrical power grids comprising electrical power generation units and high voltage AC transmission lines, the first and second electrical power grids being substantially independent of one another and further having a common boundary, the energy storage and distribution system comprising:

an energy storage facility located in substantial proximity to the common boundary of the first and second electrical power grids; and energy conversion circuitry coupled to the energy storage facility and the first and second electrical power grids, the energy conversion circuitry configured to selectively convert AC power received from the first electrical power grid into a form suitable for storage in the energy storage facility, the energy conversion circuitry further configured to selectively convert energy stored in the energy storage facility into AC power suitable for transmission via the high voltage AC transmission lines of the second electrical power grid.

8. The energy storage and distribution system of claim 7, wherein the energy storage facility is a compressed air energy storage system.

9. The energy storage and distribution system of claim 8, wherein the compressed air energy storage system utilizes a competent geological formation.

10. The energy storage and distribution system of claim 8, wherein the compressed air energy storage system utilizes a depleted hydrocarbon field.

11. The energy storage and distribution system of claim 7, wherein the energy storage facility is a pumped-hydro facility.

12. The energy storage and distribution system of claim 7, wherein the energy storage facility utilizes mass fly wheels.

13. The energy storage and distribution system of claim 7, wherein the energy storage facility utilizes capacitive battery cells.

14. The energy storage and distribution system of claim 7, wherein the energy conversion circuitry is further configured to selectively convert AC power received from the second electrical power grid into a form suitable for storage in the energy storage facility, and to selectively convert energy stored in the energy storage facility into AC power suitable for transmission via the high voltage AC transmission lines of the first electrical power grid.

15. The energy storage and distribution system of claim 7, wherein the energy conversion circuitry converts AC power received from the first electrical power grid during off-peak periods of power consumption in the first electrical power grid.

16. The energy storage and distribution system of claim 7, wherein the energy conversion circuitry converts energy stored in the energy storage facility into AC power in response to periods of peak power consumption in the second electrical power grid.

17. The energy storage and distribution system of claim 7, wherein the energy conversion circuitry is configured to selectively connect AC power received from the second electrical power grid into a form suitable for storage in the energy storage facility, the energy conversion circuitry further configured to selectively convert energy stored in the energy storage facility into AC power suitable for transmission via the high voltage AC transmission lines of the first electrical power grid.

18. A method for providing energy from a first electrical power grid to a second electrical power grid, each of the first and second electrical power grids comprising a baseload electrical power generation facility coupled via high voltage AC transmission lines, the first and second electrical power grids further having a common boundary, the method comprising the steps of:

generating primary electrical power at a baseload electrical power generation facility operating in the first electrical power grid;

selectively transmitting the primary electrical power to an energy storage and conversion facility situated in substantial proximity to the common boundary between the first and second electrical power grids;

converting, via the energy storage and conversion facility, the selectively transmitted primary electrical power into stored energy;

selectively converting the stored energy in the energy storage and conversion facility into secondary electrical power; and transmitting the secondary electrical power to the second electrical power grid.

19. The method of claim 18, wherein the step of converting the selectively transmitted primary electrical power comprises storing the primary electrical power in a compressed air energy storage system.

20. The method of claim 18, wherein the step of converting the selectively transmitted primary electrical power utilizes a pumped-hydro facility.

21. The method of claim 18, wherein the step of converting the selectively transmitted primary electrical power utilizes a mass fly wheel.

22. The method of claim 18, wherein the step of converting the selectively transmitted primary electrical power utilizes capacitive battery cells.

23. The method of claim 18, wherein the step of selectively transmitting the primary electrical power is performed during off-peak periods of power consumption in the first electrical power grid.

24. The method of claim 18, wherein the step of selectively converting the stored energy into secondary electrical power is performed in response to periods of peak power consumption in the second electrical power grid.

* * * * *